United States Patent
Stella et al.

(10) Patent No.: US 7,617,095 B2
(45) Date of Patent: Nov. 10, 2009

(54) SYSTEMS AND METHODS FOR DETECTING SILENCES IN AUDIO SIGNALS

(75) Inventors: Alessio Stella, Bologna (IT); Jan Alexis Daniel Nesvadba, Eindhoven (NL); Mauro Barbieri, Eindhoven (NL); Freddy Snijder, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1095 days.

(21) Appl. No.: 10/476,967

(22) PCT Filed: May 10, 2002

(86) PCT No.: PCT/IB02/01639

§ 371 (c)(1),
(2), (4) Date: Nov. 6, 2003

(87) PCT Pub. No.: WO02/093801

PCT Pub. Date: Nov. 21, 2002

(65) Prior Publication Data

US 2004/0125961 A1    Jul. 1, 2004

(30) Foreign Application Priority Data

May 11, 2001   (EP) ................... 01201730

(51) Int. Cl.
*G10L 11/06*   (2006.01)
*G10L 15/20*   (2006.01)
(52) U.S. Cl. ................... 704/215; 704/233

(58) Field of Classification Search ........... 704/210, 704/215, 233; 381/56
See application file for complete search history.

(56) References Cited

U.S. PATENT DOCUMENTS

| | | | | |
|---|---|---|---|---|
| 4,672,669 A * | 6/1987 | DesBlache et al. | ........... | 704/237 |
| 4,696,039 A * | 9/1987 | Doddington | ........... | 704/215 |
| 5,334,947 A * | 8/1994 | Werrbach | ........... | 330/149 |
| 5,727,121 A * | 3/1998 | Chiba et al. | ........... | 704/214 |
| 5,864,816 A * | 1/1999 | Everett | ........... | 704/500 |
| 6,324,188 B1 * | 11/2001 | Tsuji | ........... | 370/537 |
| 6,374,213 B2 * | 4/2002 | Imai et al. | ........... | 704/233 |
| 6,535,844 B1 * | 3/2003 | Wood et al. | ........... | 704/210 |
| 6,658,027 B1 * | 12/2003 | Kramer et al. | ........... | 370/516 |
| 6,693,963 B1 * | 2/2004 | Taniguchi | ........... | 375/240.11 |
| 7,319,964 B1 * | 1/2008 | Huang et al. | ........... | 704/278 |
| 2006/0029368 A1 * | 2/2006 | Harville | ........... | 386/69 |

FOREIGN PATENT DOCUMENTS

| | | | |
|---|---|---|---|
| EP | 1006685 A2 | 6/2000 | |
| EP | 1087557 A2 | 3/2001 | |

* cited by examiner

*Primary Examiner*—David R Hudspeth
*Assistant Examiner*—Brian L Albertalli (57) ABSTRACT

Silences are detected when a local signal power is below a given fixed or relative threshold value, the duration of the local signal power being below the given fixed or relative threshold value is within a first range and at least one of the parameters signal power fall/rise rate and local power deviation falls within a respective further range. The invention further relates to the use of such a silence detection in a receiver (1).

17 Claims, 5 Drawing Sheets

FIG.1

| Subband 0 Part 1 | Subband 0 Part 2 | Subband 0 Part 3 |
|---|---|---|
| Subband 1 Part 1 | Subband 1 Part 2 | Subband 1 Part 3 |
| Subband 2 Part 1 | Subband 2 Part 2 | Subband 2 Part 3 |
| Subband 3 Part 1 | Subband 3 Part 2 | Subband 3 Part 3 |
| Subband 4 Part 1 | Subband 4 Part 2 | Subband 4 Part 3 |
| Subband 5 Part 1 | Subband 5 Part 2 | Subband 5 Part 3 |
| Subband 6 Part 1 | Subband 6 Part 2 | Subband 6 Part 3 |
| Subband 7 Part 1 | Subband 7 Part 2 | Subband 7 Part 3 |
| Subband 8 Part 1 | Subband 8 Part 2 | Subband 8 Part 3 |
| Subband 9 Part 1 | Subband 9 Part 2 | Subband 9 Part 3 |
| Subband 10 Part 1 | Subband 10 Part 2 | Subband 10 Part 3 |
| Subband 11 Part 1 | Subband 11 Part 2 | Subband 11 Part 3 |
| Subband 12 Part 1 | Subband 12 Part 2 | Subband 12 Part 3 |
| Subband 13 Part 1 | Subband 13 Part 2 | Subband 13 Part 3 |
| Subband 14 Part 1 | Subband 14 Part 2 | Subband 14 Part 3 |
| Subband 15 Part 1 | Subband 15 Part 2 | Subband 15 Part 3 |
| Subband 16 Part 1 | Subband 16 Part 2 | Subband 16 Part 3 |
| Subband 17 Part 1 | Subband 17 Part 2 | Subband 17 Part 3 |
| Subband 18 Part 1 | Subband 18 Part 2 | Subband 18 Part 3 |
| Subband 19 Part 1 | Subband 19 Part 2 | Subband 19 Part 3 |
| Subband 20 Part 1 | Subband 20 Part 2 | Subband 20 Part 3 |
| Subband 21 Part 1 | Subband 21 Part 2 | Subband 21 Part 3 |
| Subband 22 Part 1 | Subband 22 Part 2 | Subband 22 Part 3 |
| Subband 23 Part 1 | Subband 23 Part 2 | Subband 23 Part 3 |
| Subband 24 Part 1 | Subband 24 Part 2 | Subband 24 Part 3 |
| Subband 25 Part 1 | Subband 25 Part 2 | Subband 25 Part 3 |
| Subband 26 Part 1 | Subband 26 Part 2 | Subband 26 Part 3 |
| Subband 27 Part 1 | Subband 27 Part 2 | Subband 27 Part 3 |
| Subband 28 Part 1 | Subband 28 Part 2 | Subband 28 Part 3 |
| Subband 29 Part 1 | Subband 29 Part 2 | Subband 29 Part 3 |
| Subband 30 Part 1 | Subband 30 Part 2 | Subband 30 Part 3 |
| Subband 31 Part 1 | Subband 31 Part 2 | Subband 31 Part 3 |

| ScaleF of Subb. 0 Part 1 | ScaleF of Subb. 0 Part 2 | ScaleF of Subb. 0 Part 3 |
|---|---|---|
| ScaleF of Subb. 1 Part 1 | ScaleF of Subb. 1 Part 2 | ScaleF of Subb. 1 Part 3 |
| ScaleF of Subb. 2 Part 1 | ScaleF of Subb. 2 Part 2 | ScaleF of Subb. 2 Part 3 |
| ScaleF of Subb. 3 Part 1 | ScaleF of Subb. 3 Part 2 | ScaleF of Subb. 3 Part 3 |
| ScaleF of Subb. 4 Part 1 | ScaleF of Subb. 4 Part 2 | ScaleF of Subb. 4 Part 3 |
| ScaleF of Subb. 5 Part 1 | ScaleF of Subb. 5 Part 2 | ScaleF of Subb. 5 Part 3 |
| ScaleF of Subb. 6 Part 1 | ScaleF of Subb. 6 Part 2 | ScaleF of Subb. 6 Part 3 |
| ScaleF of Subb. 7 Part 1 | ScaleF of Subb. 7 Part 2 | ScaleF of Subb. 7 Part 3 |
| ScaleF of Subb. 8 Part 1 | ScaleF of Subb. 8 Part 2 | ScaleF of Subb. 8 Part 3 |
| ScaleF of Subb. 9 Part 1 | ScaleF of Subb. 9 Part 2 | ScaleF of Subb. 9 Part 3 |
| ScaleF of Subb. 10 Part 1 | ScaleF of Subb. 10 Part 2 | ScaleF of Subb. 10 Part 3 |
| ScaleF of Subb. 11 Part 1 | ScaleF of Subb. 11 Part 2 | ScaleF of Subb. 11 Part 3 |
| ScaleF of Subb. 12 Part 1 | ScaleF of Subb. 12 Part 2 | ScaleF of Subb. 12 Part 3 |
| ScaleF of Subb. 13 Part 1 | ScaleF of Subb. 13 Part 2 | ScaleF of Subb. 13 Part 3 |
| ScaleF of Subb. 14 Part 1 | ScaleF of Subb. 14 Part 2 | ScaleF of Subb. 14 Part 3 |
| ScaleF of Subb. 15 Part 1 | ScaleF of Subb. 15 Part 2 | ScaleF of Subb. 15 Part 3 |
| ScaleF of Subb. 16 Part 1 | ScaleF of Subb. 16 Part 2 | ScaleF of Subb. 16 Part 3 |
| ScaleF of Subb. 17 Part 1 | ScaleF of Subb. 17 Part 2 | ScaleF of Subb. 17 Part 3 |
| ScaleF of Subb. 18 Part 1 | ScaleF of Subb. 18 Part 2 | ScaleF of Subb. 18 Part 3 |
| ScaleF of Subb. 19 Part 1 | ScaleF of Subb. 19 Part 2 | ScaleF of Subb. 19 Part 3 |
| ScaleF of Subb. 20 Part 1 | ScaleF of Subb. 20 Part 2 | ScaleF of Subb. 20 Part 3 |
| ScaleF of Subb. 21 Part 1 | ScaleF of Subb. 21 Part 2 | ScaleF of Subb. 21 Part 3 |
| ScaleF of Subb. 22 Part 1 | ScaleF of Subb. 22 Part 2 | ScaleF of Subb. 22 Part 3 |
| ScaleF of Subb. 23 Part 1 | ScaleF of Subb. 23 Part 2 | ScaleF of Subb. 23 Part 3 |
| ScaleF of Subb. 24 Part 1 | ScaleF of Subb. 24 Part 2 | ScaleF of Subb. 24 Part 3 |
| ScaleF of Subb. 25 Part 1 | ScaleF of Subb. 25 Part 2 | ScaleF of Subb. 25 Part 3 |
| ScaleF of Subb. 26 Part 1 | ScaleF of Subb. 26 Part 2 | ScaleF of Subb. 26 Part 3 |
| ScaleF of Subb. 27 Part 1 | ScaleF of Subb. 27 Part 2 | ScaleF of Subb. 27 Part 3 |
| ScaleF of Subb. 28 Part 1 | ScaleF of Subb. 28 Part 2 | ScaleF of Subb. 28 Part 3 |
| ScaleF of Subb. 29 Part 1 | ScaleF of Subb. 29 Part 2 | ScaleF of Subb. 29 Part 3 |
| ScaleF of Subb. 30 Part 1 | ScaleF of Subb. 30 Part 2 | ScaleF of Subb. 30 Part 3 |
| ScaleF of Subb. 31 Part 1 | ScaleF of Subb. 31 Part 2 | ScaleF of Subb. 31 Part 3 |

SYSTEMS AND METHODS FOR DETECTING SILENCES IN AUDIO SIGNALS

The invention relates to detecting silences in audio signals. The invention further relates to using such silence detection in commercial detection.

EP 1 006 685 A2 discloses a method and apparatus for processing a television signal, and for detecting the presence of commercials in the television signal. A commercial candidate section detector detects a commercial candidate section on the basis of a quiet section and a scene change point. A commercial characteristic quantity detector judges whether the commercial candidate section has various characteristics of commercials, and adds a predetermined value to a commercial characteristic value on the basis of the judgment result. The commercial characteristics quantity detector compares the final commercial characteristic value with a predetermined threshold value, and judges on the basis of the comparison result whether the commercial candidate section is a commercial section. A quiet section detector compares the level of a digitized audio signal with a threshold value to detect quiet sections, and outputs the comparison result to a scene change detector. Further reference is made to EP 1 087 557 A2.

It is an object of the invention to provide an advantageous silence detection. To this end, the invention provides a method for detecting silences, a silence detector and a receiver as defined in the independent claims. Advantageous embodiments are defined in the dependent claims.

According to a first aspect of the invention, silences are detected when a local signal power is below a given fixed or relative threshold value, the duration of the local signal power being below the given fixed or relative threshold value is within a first range and at least one of the parameters signal power fall rate and local power deviation falls within a respective further range. The signal power fall rate is determined before or about a time where the local signal power level falls below the given fixed or relative threshold power level, and the local signal power deviation is determined during at least part of the duration the local signal power level is below the given fixed or relative threshold power level. The linear deviation and/or fall rate are used to filter part of the silences, which may be perceptual but are not relevant for the commercial detection. Instead of or in addition to the fall rate one may use a rise rate which is determined about a time where the local signal power level rises above the given fixed or relative threshold power level.

In a preferred embodiment, a silence beginning time, the silence duration and the local signal power level are used in a subsequent statistical model to determine whether the content between consecutive detected silences is a commercial or not. These parameters are available in the silence detection and can therefore advantageously be re-used in determining whether the content between the consecutive detected silences is really a commercial or not.

When the audio signal comprises blocks of quantized samples, a given block being provided with a set of scale factors, the silence detection preferably extracts the set of scale factors from the compressed audio signal, and estimates the signal power in the given block based on a combination of the scale factors. The given block may be an audio frame or part of an audio frame. Scale factors can easily be extracted from the compressed audio. This aspect of the invention is based on the insight that a scale factor represents the maximum possible value of the samples it relates to. A combination of the scale factors, e.g. a sum of the squared scale factors therefore gives a rough estimation of the signal power, only requiring limited computational load. The rough estimation is quite sufficient for some applications such as e.g. silence detection in commercial detectors. Even more advantageous is to use only a sub-set of the set of scale factors. By using only a sub-set of the total set of scale factors, the computational load is further reduced. This may result in a lower accuracy, but this is not so relevant for some applications like silence detection for commercials etc. Forming a sub-set may be performed by omitting scale factors in time direction and/or in frequency direction. For example, the sub-set may only include a sub-set of a plurality of narrow band sub-signals available in the compressed audio signal, the sub-set preferably including the scale factors of a number of lower frequency sub-signals. In the case the compressed audio signal is a stereo or multi-channel signal, only a subset of the available channels may be used.

It is noted that WO 96/3271 A1 discloses a system for compression and decompression of audio signals for digital transmission, wherein ancillary data may be multiplexed and encoded with audio data and transmitted in such a way that it may be decoded. This document discloses on page 159 the calculation of a minimum scale factor value to look for in another channel to see if audio is present.

The invention further relates to a method and a device for transmitting a program, the program at least including an audio signal, wherein time intervals are detected which have a relatively low signal power level in the audio signal, and wherein additional silences are introduced in the time intervals which additional silences are shorter than the time intervals and which additional silences have a lower signal power level than the audio signal during the time intervals. By providing additional silences in low power time intervals cues are transmitted to control a commercial detector, which uses silence detection. Providing the additional silences in low power time intervals has the advantage that their audibility is low when compared to adding silences in high signal power time intervals. Preferably the silences have power deviation levels and power fall/rise rates within the ranges which correspond to those of the silence detector at the receiver side. The invention also provides a signal and a storage medium.

These and other aspects of the invention will be apparent from and elucidated with reference to the accompanying drawings.

In the drawings:

FIG. 2 shows an exemplary audio frame including 32 sub-bands, each sub-band being subdivided in 3 blocks, each block being including 12 quantized samples and being provided with a scale factor;

FIG. 3 shows the exemplary audio frame of FIG. 2 wherein for each sub-band a maximum scale factor is selected, a possible selection is highlighted in gray;

The drawings only show those elements that are helpful to understand the embodiments of the invention.

Figure 1:
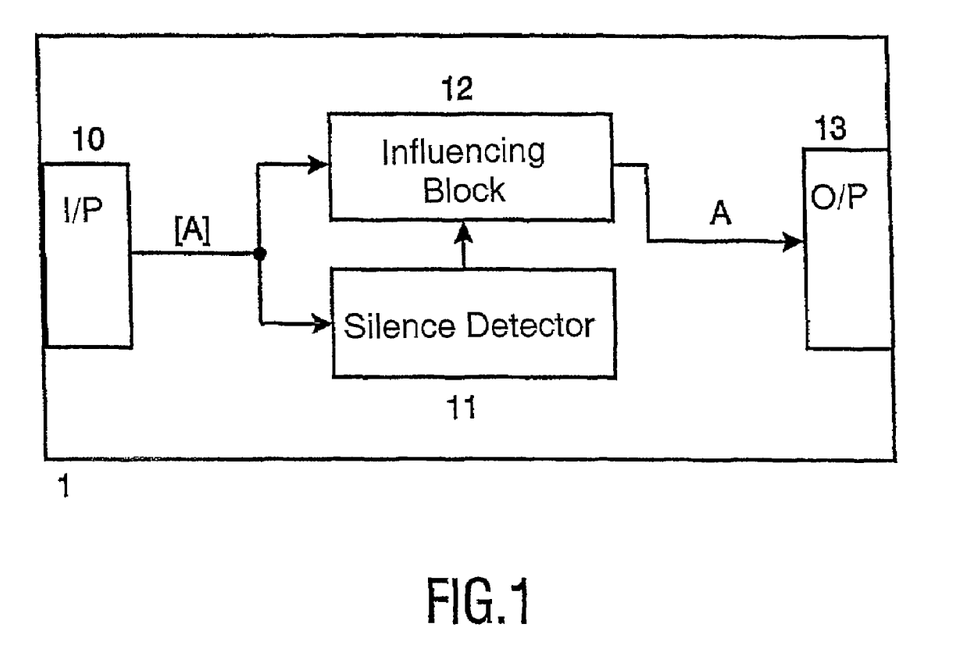
FIG. 1 shows a receiver according to an embodiment of the invention.

FIG. 1 shows a receiver 1 according to an embodiment of the invention for receiving a compressed audio signal [A]. The receiver 1 comprises an input 10 for obtaining the compressed audio signal [A]. The input 10 may be an antenna, a network connection, a reading device, etc. The receiver 1 further comprises a silence detector 11 for detecting silences in the compressed audio signal, and an influencing block 12 for influencing the audio signal depending on the detection of the silences. The block 12 may e.g. be a decoder for decoding the compressed audio signal, wherein the decoding depends on the detected silences. The block 12 may also be a skipping block for skipping parts of the compressed audio depending on the detected silences. The silence detector 11 may be enhanced to form a commercial detector. Detected commercials may be skipped during decoding. The influenced audio signal A, decoded or still compressed, can be outputted to output 13. The output 13 may be a network connection, a reproduction device or a recording device. The compressed audio signal [A] may be included in a program stream, which program stream further includes a video signal. In that case, the program signal may be influenced in block 12 at least partly depending on the silences detected in the compressed audio signal. An advantageous application is a storage device, which stores only non-commercial content.

A commercial detector according to an embodiment of the invention automatically detects commercial blocks in audio-visual streams. This allows to skip commercials during any kind of processing such as key-frame extraction, editing or playback. For several audio features, local statistics are measured on a sliding window and compared to a statistical model of commercials. By this comparison a normalized likelihood function is derived which tells how the audio signal is locally similar to commercials. The likelihood function can be properly triggered for the commercial detection. The statistical window is chosen in order to be both detailed in the local analysis and robust against local irregularities and fluctuations, which do not affect the detection. The algorithm is adaptive to some conditions, which can vary along a single stream or between one stream and another. The algorithm is video independent. Video analysis can nevertheless be included to enhance or extend the classification. The algorithm can be applied to several kinds of storage systems.

Many audio coders (e.g. MPEG-1 Layer 1/2/3, MPEG-2 Layer 1/2/3, MPEG-2 AAC, MPEG-4 AAC, AC-3) are frequency domain coders. They split the source spectrum into a number of narrow band sub-signals and quantize each frequency component or sample separately. Frequency components or samples are quantized according to a scale factor and according to a bit allocation. These scale factors can be regarded as indicators of the maximum value of frequency components or samples.

In AC-3 the frequency components are represented by: mantissa.$2^{(-exponent)}$. Here the exponent acts as a scale factor for each mantissa, equal to $2^{(-exponent)}$.

In MPEG-1 layer 2 the narrow band sub-signals are divided in groups of 12 quantized samples, where each group has a corresponding scale factor. This scale factor corresponds to the maximum value of the samples it relates to.

The detection algorithm preferably uses a subset of the scale factors. In all or a subset of the narrow band sub-signals an upper bound of the signal power is calculated by squaring the scale factors.

An embodiment using MPEG audio compression is described in more detail now. In MPEG-1 layer 2 the audio signal is divided in time intervals of 24 msec, 26.1 msec or 36 msec for a sampling rate of 48 kHz, 44.1 kHz or 32 kHz respectively. In each of these intervals the signal is encoded in a frame. Referring to FIG. 1, each frame interval is divided in three parts and the signal is decomposed in 32 subband components. For each subband component and each third of a frame (one rectangle in FIG. 1) 12 samples are quantized according to a scale factor and according to a number of bits properly chosen. The scale factor gives an upper bound estimate of the absolute value of the 12 samples. This estimate may not be very accurate, but this is not required for the commercial detection. The scale factors can be extracted from each audio frame with negligible computational load, as they are directly available in the frame as pseudo logarithmic indexes. Only some limited frame header decoding is required. No decompression is necessary.

In stereo mode each channel has its own 96 scale factors per frame. The detection algorithm selects only the maximum scale factor in each subband of the left or right channel (see FIG. 2): 32 values are buffered and converted to the linear (not logarithmic) format. For instance, for a 48 kHz audio sampling rate, only subbands 0 . . . 26 are used according to the standard: this gives 27 samples every 24 msec that is 1125 samples/sec, a very modest input data rate for the commercial detector. The squares of the buffered scale factors are calculated to obtain an upper bound on the subband signal powers. These are then used as follows:

(1) their sum gives an upper bound on the total short time power;

(2) they can be used to calculate a short time bandwidth estimation;

The following table gives a few of the pseudo logarithmic indexes for the scale factors in MPEG-1 layer 2 (see Table B.1 in ISO/IEC 11172-3: 1993):

| index | scalefactor |
| --- | --- |
| 0 | 2.0000 |
| 1 | 1.5874 |
| 2 | 1.2599 |
| 3 | 1.0000 |
| 4 | 0.7937 |
| 5 | 0.6299 |

An estimate of the short time power for an audio frame j is given below:

$$\text{Frame}_{13}\text{ power}_j \approx \Sigma \text{scalefactor}_{j,i}^2 \approx \Sigma 10^{0.6-0.2 \cdot index}$$

It is alternatively possible to use a look-up-table to find the scale factor. The summation is to be performed over the number of sub-bands at a given time instance. When a sub-set of sub-bands is used, the summation has to be performed over the total number of sub-bands or the number of used sub-bands depending on the application.

Silence detection is based on nested thresholds on:

1) local signal power level, by using e.g. Frame_power as indicated above 2) silence duration;

and at least one of the following parameters:

3) local power linear deviation during silence; and 4) local power fall rate before silence start; and 5) local power rise rate at silence end;

Because signal power characteristics are very much dependent on the environment in which the silence detector operates the silence detector is preferably adaptive. Therefore, in order to be adaptive, local power level related parameters (i.e. 1), 3) and/or 4) ) are compared with their average values in time. A typical threshold for the local signal power is 0.01, i.e. the local signal power should be less than one percent of the time average of the signal power. The time average is calculated by using an adaptation window with length w frames. A practical solution is the following:

$$\text{average\_frame\_power}_{-1} = 0$$

$$\text{average\_frame\_power}_j = \begin{cases} \text{average\_frame\_power}_{j-1} \frac{j-1}{j} + \frac{\text{frame\_power}_j}{j} & \text{if } (j<w) \\ \text{average\_frame\_power}_{j-1} \frac{w-1}{w} + \frac{\text{frame\_power}_j}{w} & \text{else} \end{cases}$$

wherein j is the frame index.

The silence duration is the duration that the local signal power level is below a given fixed or adaptive threshold power level. The linear deviation is a summation of (frame power minus mean frame power) over at least part of the silence duration. The linear deviation and fall/rise rate are used to filter part of the silences, which may be perceptual but are not relevant for the commercial detection. The local signal power level is preferably determined by using the scale factors as described above, for example per audio frame or part of an audio frame.

A practical range for silence duration breaks between commercials in a commercial block is 3/25 sec to 20/25 sec.

The values of silence beginning time, silence duration and silence local power level are buffered for the statistical calculations mentioned below. The commercials are characterized with a local statistical model of the following features:

1) time distance between two consecutive detected silences;

2) local signal power level of the detected silences (absolute and/or relative);

3) silence duration; and 4) local bandwidth of the audio signal;

The local bandwidth of an audio frame j may be calculated from the scale factors in the following manner:

$$\text{local\_bandwidth}_j = const \cdot \left[ \frac{\sum_{i=0}^{used\_subbands-1} i^2 \cdot scalefactor_{j,i}^2}{\text{frame\_power}_j} - \left( \frac{\sum_{i=0}^{used\_subbands-1} i \cdot scalefactor_{j,i}^2}{\text{frame\_power}_j} \right)^2 \right]$$

For each feature a 0.5-normalised likelihood function is obtained, with values between 0 and 1. It represents how much the local statistics of this feature are similar to those of commercials. The different likelihood functions are then combined with different weights to obtain a global likelihood function, still 0.5 normalized, which exploits all the information at a time. The global likelihood function is calculated in each point of the time axis, which was buffered as a silence beginning instant. The value 0.5 means basically "total uncertainty" or "0.5 probability of being inside a commercial block". The likelihood function can be used in different ways. It can be properly triggered to detect commercial boundaries.

It can be used (as a normalized soft classification between commercials and non-commercials) by algorithms that make further analysis and classifications, exploiting optionally also video features. Video features of different levels (like mono-luminance, mono-chrominance frame detection, scene change detection) can be statistically analyzed together with audio features applying the same likelihood method or other methods. The triggered commercial detection with refilling has been developed and tested, based on the previously described audio analysis. The 0.5 normalization likelihood function L(t) can be used to decide whether a detected silence belongs to a commercial block. This can be done by means of a function Q(L(t)), which is defined as follows:

$$Q(L(t))=1 \text{ if } L(t)>0.5$$

$$Q(L(t))=0 \text{ if } L(t)<=0.5,$$

where a value of 0 and 1 mean that the detected silence belong to a non-commercial block and commercial block respectively.

In a practical embodiment, a sequence of commercials is only detected if it lasts at least 60 sec. If only for a short interval inferior to 45 sec the likelihood function goes below 0.5, Q(t) is set to 1. This procedure has been called "internal refilling". The internal refilling eliminates sporadic internal missing detections. An "external refilling" is applied at the beginning and end of the commercials. For instance if:

$t_i, t_{i+1}, \ldots, t_{i+N}, \ldots$ is a sequence of instants in which detected silences start and $$L(t_i)=0.2$$

$$L(t_{i+1})=0.4$$

$$L(t_{i+2})=0.6$$

$$L(t_j)>0.5 \text{ for each } j=i+3, \ldots, i+N$$

$$L(t_j)<0.5 \text{ for } j>i+N \text{ and if}$$

$$t_{i+2}-t_{i+1}<45.0 \text{ sec}$$

$$t_{i+N+1}-t_{i+N}<45.0 \text{ sec}$$

then $$Q(L(t_i))=0$$

$$Q(L(t_{i+1}))=1$$

$$Q(L(t_{i+2}))=1$$

$$\ldots$$

$$Q(L(t_{i+N+1}))=1$$

$$Q(L(t_j))=0 \text{ for } j>i+N+1$$

The external refilling is effective in avoiding the systematic miss of the first and last spots. This fact is related to windowing details. The external and internal refilling can be considered as a special non-linear filtering, upper driven. A general-purpose statistical model of commercial blocks may be used. It is possible to refine the statistical detail, using different commercial block models for the different times of the day and/or the different kind of programs (soaps, talk shows, football matches, etc.) and/or the different channels. Although this is not necessary to obtain satisfying performances, it may of course improve them. It is a matter of trade off between the complexity of the target system and its performance. Adaptability of the detection is preferred as the conditions change in time for a single channel. Moreover adaptability to channel switching is preferred. In particular the local minimum noise level may change in time for a single channel and can change a lot from one channel to another: this is critical for silence detection. Besides, adaptability in the statistical model of commercial blocks is not critical but useful. The system may be implemented as a fully self-training (adaptive) on the local minimum noise level. The only constraint is applying a reset of the algorithm every time the channel is switched. This is because the adaptability is fast in the initial period and slower in the following, for matters of trade off between adaptability and precision. If the algorithm is made fast adaptive at any time, the precision of the detection will decrease because inside the commercial blocks a relatively fast adaptation will decrease the precision. In a practical embodiment, the switch-adaptability is valid only in the first minutes (i.e. reset for any successive switch) while the along-a-single-channel adaptability always holds. Stability of adaptability is ensured by an asymmetric scheme. When the minimum noise level is decreasing adaptability is faster than when it is increasing. This means for instance that the local power energy threshold for the silence detection decreases relatively fast when a silence is detected with a local power energy lower than the ones detected before. There are two kinds of errors which can occur: either missing commercial detection or false commercial detection. Both are relatively low and confined to the beginning or ending part of commercial blocks. The algorithm is anyhow flexible: decision parameters can vary the trade off between the two error rates, depending on which is more relevant. For instance, if commercial block detection is a preprocessing for automatic key-frame extraction, then a low missing detection rate is more important. Low false detection is more relevant in the case of a simple playback. Referring to the features chosen (but others may be added), it is possible to evaluate separately local power energy and bandwidth without subband analysis. The value of the bandwidth is required with a low sampling rate on a two minutes (other values may be chosen) symmetric sliding window. Therefore it can be estimated for instance by the average of successive short interval FFT's with a low number of points. It is possible to implement different kinds of normalizations and combinations of one or several likelihood functions, either term by term or globally. A practical implementation is based on product combination term by term or globally with renormalization. The product is basically a Boolean AND extended from the Boolean set {0, 1} to the continuous interval [0, 1]. It ensures good selectivity. Roughly speaking, different conditions are softly imposed all at a time. They do not need to be all perfectly fulfilled but they need to be all mostly fulfilled. An addition combination instead would have been a sort of extension of the Boolean OR, which does not ensure sufficient selectivity. Further selectivity and robustness is ensured by the hard decision on the likelihood with a duration threshold. Likelihood-noise tolerance is ensured by the internal refilling as well.

Figure 4:
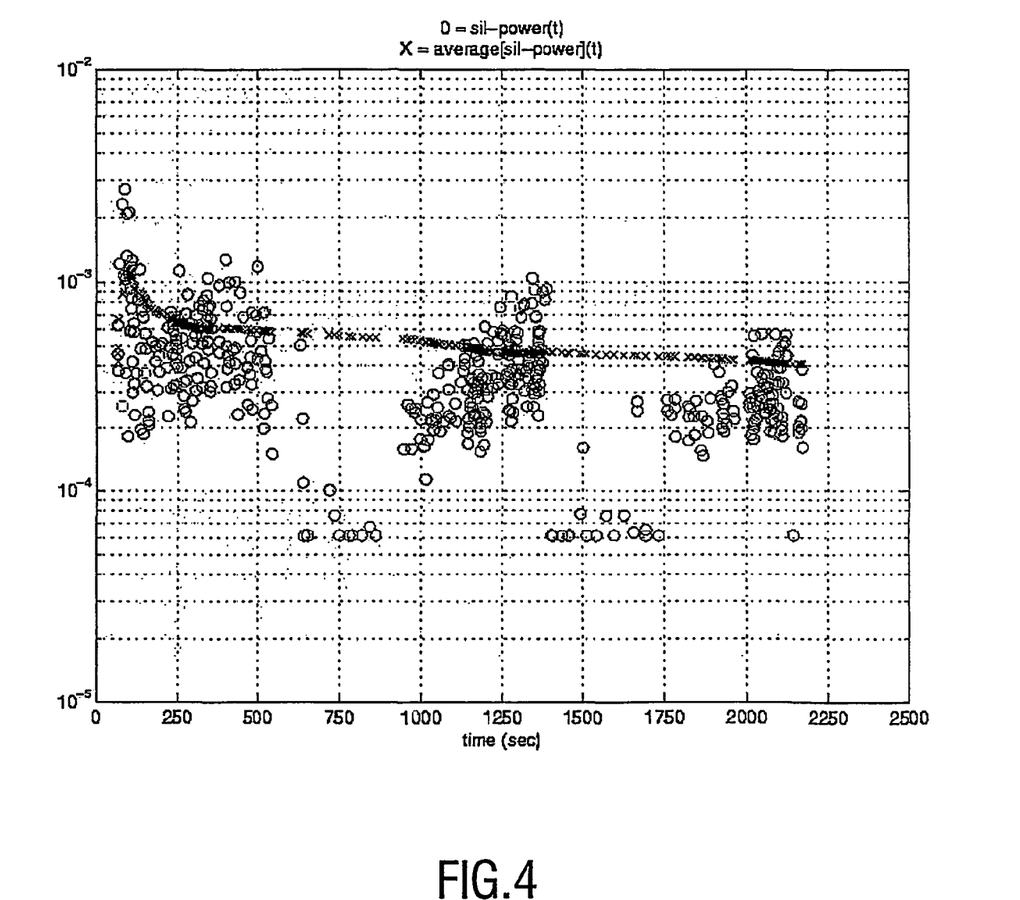
FIG. 4 shows an exemplary diagram wherein circles represent local signal powers of detected silences and wherein crosses represent an average of these local signal powers.
Figure 5:
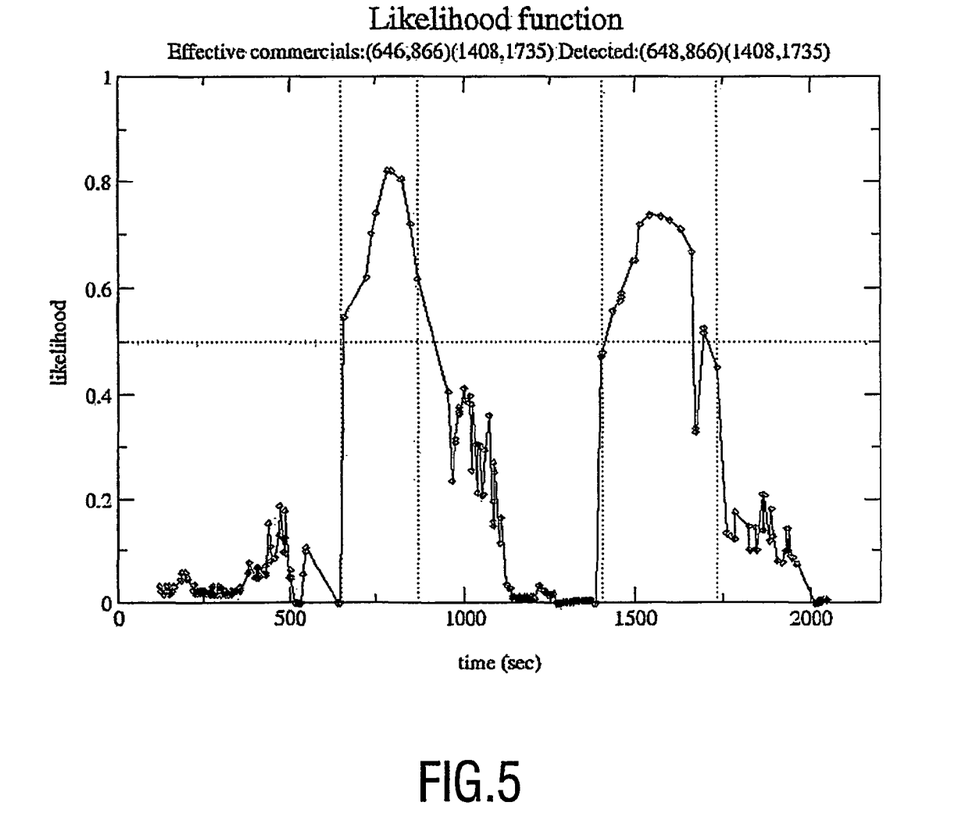
FIG. 5 shows an exemplary likelihood function related to FIG. 4.

In the following example a recording of 36 minutes is considered. The recording starts with the last part of a movie. Seconds [646, 866] contain commercials. In second 866 a TV show starts. Other commercials are in the interval [1409, 1735] seconds. FIG. 4 plots with circles the local signal powers calculated during each detected silence. The crosses represent the backward average of these values. It is evident that commercial silences (in the intervals [646, 866] and [1409, 1735]) are mainly cut silences, with lower power. It can be roughly noticed the different distribution of the silences inside the commercials. For instance most of them are distant 10-30 sec. Statistical details like the ones shown are used in the likelihood function estimation. FIG. 5 plots the obtained likelihood function. The filled triggering detects [648, 866] and [1408, 1735].

Possible Variations

1) It is possible to buffer a bigger portion of the scale factors. It is also possible to subsample them. The current selection of 32 out of the 96 left channel scale factor has proved to be effective.

2) It is possible to choose a different set of audio features. Careful investigation is needed of course before introducing other features.

3) As mentioned above, it is possible to implement different kinds of normalizations and combinations of one or several likelihood functions. The current implementation is based on product combination with renormalization. The product is basically a Boolean AND extended from the Boolean set {0, 1} to the continuous interval [0, 1]. It ensures good selectivity. A semi-sum is a sort of extension of the Boolean OR, which does however not ensure sufficient selectivity.

4) The choice of triggering the global likelihood function with refilling can be modified, for instance if different windowing modalities and/or different audio features are used.

5) Recognition of particular audio sequences, like those regularly put at the beginning and/or end of commercial blocks by many broadcasters, might also be achieved by processing the scale factors directly.

At the transmitter side it is possible to help the likelihood function by adapting the cut silences in such a way that they are better detected, for example by lowering their signal power, by adapting the silence duration, by increasing the signal power fall rate, and/or by decreasing the power deviation during the silence. On the contrary, it is also possible to lower the detectability of cut silences by increasing their signal power e.g. by introducing noise, by adapting the silence duration, by decreasing the signal power fall rate and/or by increasing the power deviation during the silence. Further, it is also possible to introduce fake cut silences in the signal. In practical embodiments, a fake cut silence of 0.15 seconds with low power similar to that of a cut silence and a separation of 30 seconds will probably spoil the commercial block detection. Fake cut silences are preferably inserted in already existing silences such as speech silences. In that case, they will hardly be noticeable by an average user.

The algorithm detects commercial blocks in audio-visual material and marks their boundaries. Commercial blocks can then be skipped during any kind of processing like browsing, automatic trailer creation, editing or simple playback. This functionality can be integrated in several kinds of storage systems, with very low additional cost. It can be applied either in real time during acquisition of the data or off line to stored material.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. This word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for detecting silences in an audio signal with a silence detector, the method comprising the steps of:
   determining a local signal power level in the audio signal;
   determining a duration of the local signal power level being below a given threshold power level;
   determining at least one of the following parameters:
      a signal power fall rate before or about a time where the local signal power level falls below the given threshold power level, and
      a local signal power deviation during at least part of the duration the local signal power level is below the given threshold power level; and
   detecting a silence as occurring in the audio signal whenever the local signal power level is below the given threshold power level, and the duration is within a first range, and the at least one determined parameter falls within a respective further range.

2. The method as claimed in claim 1, wherein a silence beginning time, the silence duration and the local signal power level are used in a subsequent statistical model to determine whether the content between consecutive detected silences is a commercial or not.

3. The method as claimed in claim 1, wherein the audio signal comprises blocks of quantized samples, a given block being provided with a set of scale factors, and wherein the method further comprises the steps of:
   extracting the set of scale factors from the audio signal; and
   estimating the signal power in the given block based on a combination of the scale factors.

4. The method as claimed in claim 3, wherein the extracting step and estimating step are performed on only a sub-set of the set of scale factors.

5. The method as claimed in claim 3, wherein the audio signal comprises a plurality of narrow band sub-signals, each narrow band sub signal being subdivided into signal blocks, each block including quantized samples and each block being provided with one or more scale factors, and wherein the extracting step is performed on one or more of the sub-signals.

6. The method as claimed in claim 5, wherein the extracting step is performed on only a sub-set of the plurality of sub-signals.

7. The method as claimed in claim 6, wherein the sub-set mainly includes the scale factors of a number of lower frequency sub-signals.

8. The method as claimed in claim 4, wherein the blocks are subdivided into at least two sub-blocks, each sub-block being provided with a scale factor, and wherein per block only a maximum scale factor is extracted for use in the estimating step.

9. The method as claimed in claim 3, wherein the compressed audio signal is a stereo or multi-channel signal, and wherein the extracting is performed on only a subset of the available channels.

10. The method as claimed in claim 1, wherein the local signal power deviation is a summation of a difference between the local signal power level, and an average signal power level over at least part of a silence duration.

11. The method as claimed in claim 1, wherein the at least one determined parameter comprises the signal power fall rate before or about a time where the local signal power level falls below the given threshold power level.

12. A silence detector for detecting silences in an audio signal, the silence detector comprising:
   means for determining a local signal power level in the audio signal;
   means for determining a duration of the local signal power level being below a given threshold power level;
   means for determining at least one of the following parameters:
      a signal power fall rate before or about a time where the local signal power level falls below the given threshold power level, and
      a local signal power deviation during at least part of the duration the local signal power level is below the given threshold power level; and
   means for detecting a silence as occurring in the audio signal whenever the local signal power level is below the given threshold power level, and the duration is within a first range, and the at least one determined parameter falls within a respective further range.

13. A receiver for receiving a compressed audio signal, the receiver comprising:
   an input for obtaining a compressed audio signal;
   a silence detector as claimed in claim 12 for detecting silences in the compressed audio signal; and
   means for influencing the audio signal wherein the influencing at least partly depends on the detection of the silences.

14. The silence detector as claimed in claim 12, wherein the local signal power deviation is a summation of a difference between the local signal power level, and an average signal power level over at least part of a silence duration.

15. The silence detector as claimed in claim 12, wherein the at least one determined parameter comprises the signal power fall rate before or about a time where the local signal power level falls below the given threshold power level.

16. A method of transmitting a program with a transmitter, the program at least including an audio signal, the method comprising the steps of:
   detecting time intervals in the audio signal having relatively low signal power level; and
   introducing additional silences in the time intervals in response to detecting the relatively low signal power level in the audio signal, said additional silences being shorter than the time intervals, and said additional silences having a lower signal power level than the audio signal during the time intervals, wherein said additional silences further comprise cues in the audio signal of the transmitted program configured to control silence detection of a receiver side silence detector.

17. A transmitter for transmitting a program, the program including at least an audio signal, the transmitter comprising:
   means for detecting time intervals in the audio signal having relatively low signal power level; and
   means for introducing additional silences in the time intervals in response to detecting the relatively low signal power level in the audio signal, said additional silences being shorter than the time intervals; and said additional silences having a lower signal power level than the audio signal during the time intervals, wherein said additional silences further comprise cues in the audio signal of the transmitted program configured to control silence detection of a receiver side silence detector.

* * * * *